(12) United States Patent
Watanabe (10) Patent No.: US 12,184,660 B2
(45) Date of Patent: Dec. 31, 2024

(54) VIRTUAL ID AND METHODS OF USE THEREOF

(71) Applicant: Defenders Gateway, Inc., St. Louis, MO (US)

(72) Inventor: Carol Watanabe, St. Louis, MO (US)

(73) Assignee: Defenders Gateway, Inc., St. Louis, MO (US)

(*) Notice: Subject to any disclaimer, the term of this patent is extended or adjusted under 35 U.S.C. 154(b) by 227 days.

(21) Appl. No.: 17/883,366

(22) Filed: Aug. 8, 2022

(65) Prior Publication Data

US 2022/0377082 A1    Nov. 24, 2022

Related U.S. Application Data

(63) Continuation-in-part of application No. 16/682,703, filed on Nov. 13, 2019, now abandoned.

(60) Provisional application No. 62/760,418, filed on Nov. 13, 2018.

(51) Int. Cl.
*H04L 9/40* (2022.01)

(52) U.S. Cl.
CPC ........ *H04L 63/107* (2013.01); *H04L 63/0861* (2013.01)

(58) Field of Classification Search
CPC .......................... H04L 63/0861; H04L 63/107
See application file for complete search history.

(56) References Cited

U.S. PATENT DOCUMENTS

| 6,076,068 | A  | * | 6/2000 | DeLapa ............... G06Q 20/387 235/383 |
| 6,862,575 | B1 | * | 3/2005 | Anttila ............... G06Q 30/0239 705/14.35 |
| 7,314,162 | B2 |   | 1/2008 | Carr et al. |
| 7,333,001 | B2 |   | 2/2008 | Lane et al. |
| 7,566,002 | B2 |   | 7/2009 | Love et al. |
| 9,380,421 | B1 | * | 6/2016 | Vltavsky ............... H04W 4/021 |
| 9,595,049 | B2 |   | 3/2017 | Showers et al. |

(Continued)

OTHER PUBLICATIONS

B. Carbunar, R. Sion, R. Potharaju and M. Ehsan, "Private Badges for Geosocial Networks," in IEEE Transactions on Mobile Computing, vol. 13, No. 10, pp. 2382-2396, Oct. 2014. (Year: 2014).*

(Continued)

*Primary Examiner* — Kari L Schmidt
(74) *Attorney, Agent, or Firm* — Polsinelli PC (57) ABSTRACT

Disclosed are systems and techniques for generating an electronic identity verification object for verifying the identity of a user. In one example, the systems and techniques can receive a current position of an electronic device associated with a user and a search request for filtering a plurality of locations. A list of available locations can be generated using the current position and the search request to determine a filtered subset of the plurality of locations. A selected location, from the list of available locations, can be received. An identity of the user can be verified to include or more user attributes. In response to verifying the identity of the user, a distance between the current position and the selected location can be determined. If the distance is below a threshold, an electronic identity verification object uniquely associated with a verified user attribute and the selected location can be generated.

20 Claims, 5 Drawing Sheets

(56) References Cited

U.S. PATENT DOCUMENTS

| | | | |
|---|---|---|---|
| 10,354,246 B1* | 7/2019 | Janiga | G07F 19/204 |
| 10,832,285 B2* | 11/2020 | Meredith | H04W 4/021 |
| 2002/0082885 A1* | 6/2002 | Pittroff | G06Q 20/10 |
| | | | 235/380 |
| 2002/0194069 A1* | 12/2002 | Thakur | G06Q 30/0216 |
| | | | 705/14.18 |
| 2003/0233278 A1* | 12/2003 | Marshall | G06Q 30/0211 |
| | | | 705/14.35 |
| 2008/0033807 A1* | 2/2008 | Black | G06Q 30/0248 |
| | | | 705/14.47 |
| 2011/0178863 A1 | 7/2011 | Daigle | |
| 2011/0221568 A1* | 9/2011 | Giobbi | H04W 12/06 |
| | | | 340/5.82 |
| 2012/0203572 A1* | 8/2012 | Christensen | G06Q 30/02 |
| | | | 705/2 |
| 2013/0048720 A1* | 2/2013 | Lewis | G07C 9/253 |
| | | | 235/382 |
| 2013/0297422 A1* | 11/2013 | Hunter | H04H 60/63 |
| | | | 705/14.58 |
| 2013/0332274 A1 | 12/2013 | Faith et al. | |
| 2015/0058136 A1* | 2/2015 | Jain | G06Q 30/0269 |
| | | | 705/14.66 |
| 2015/0112790 A1* | 4/2015 | Wolinsky | G06Q 20/3274 |
| | | | 705/14.38 |
| 2015/0161643 A1* | 6/2015 | Randell | G06Q 30/0235 |
| | | | 705/14.26 |
| 2015/0245180 A1* | 8/2015 | Lin | G01S 5/02522 |
| | | | 455/456.3 |
| 2015/0381577 A1* | 12/2015 | Reitsma | H04W 12/04 |
| | | | 713/168 |
| 2016/0078468 A1* | 3/2016 | Higgins | G06Q 30/0609 |
| | | | 705/26.35 |
| 2016/0080381 A1 | 3/2016 | Hall | |
| 2017/0068982 A1* | 3/2017 | Vangala | G06Q 30/0224 |
| 2017/0111358 A1 | 4/2017 | Hall | |
| 2017/0346820 A1* | 11/2017 | Valla | H04L 51/222 |
| 2018/0014150 A1* | 1/2018 | Elias | G07C 9/28 |
| 2019/0043080 A1* | 2/2019 | Buchalter | G06Q 30/0245 |
| 2019/0045478 A1* | 2/2019 | Runyon | H04W 4/029 |
| 2020/0037140 A1* | 1/2020 | Hassan | H04W 12/08 |
| 2020/0364730 A1* | 11/2020 | Garel | G06Q 30/0201 |
| 2021/0394766 A1* | 12/2021 | Crawford | B60W 50/087 |

OTHER PUBLICATIONS

A. Harris, R. Snader and R. Kravets, "Aggio: A Coupon Safe for Privacy-Preserving Smart Retail Environments," 2018 IEEE/ACM Symposium on Edge Computing (SEC), Seattle, WA, USA, 2018, pp. 174-186. (Year: 2018).*

Patil, Sameer, et al. "Reasons, rewards, regrets: privacy considerations in location sharing as an interactive practice." proceedings of the Eighth Symposium on Usable Privacy and Security. 2012, pp. 1-15. (Year: 2012).*

ID.me website, home page, 6 pages.

* cited by examiner

VIRTUAL ID AND METHODS OF USE THEREOF

CROSS REFERENCE TO RELATED APPLICATIONS

This application claims priority under 35 USC § 119(e) to U.S. patent application Ser. No. 16/682,703, filed on Nov. 13, 2019, which claims priority to U.S. Patent Application Ser. No. 62/760,418, filed on Nov. 13, 2018, the entire contents of which are both hereby incorporated by reference.

FIELD

The present invention relates generally to methods for verifying the identity of an individual.

BACKGROUND

Businesses that would like to provide benefits or services to defenders (i.e. service members, veterans, police, fire and EMTs) often do not have a way of directing defenders to their location and/or ensure that only verified defenders are receiving the benefits.

Accordingly, there is a need for a way to verify the identity of an individual such that only verified individuals receive a benefit associated with an establishment.

BRIEF SUMMARY

The disclosure provides for a method for verifying the identity of an individual. For example, the disclosure can provide for a method for generating an electronic identity verification object. In some aspects, the method may include receiving, from an electronic device associated with a user, a current position of the electronic device and a search request including one or more parameters for filtering a plurality of locations; generating a list of available locations based on the current position of the electronic device and the search request, wherein the list of available locations is a filtered subset of the plurality of locations; receiving, from the electronic device, a selection of a selected location included in the list of available locations; verifying an identity of the user, wherein the identity of the user includes one or more user attributes; in response to successfully verifying the identity of the user, determining a distance between the current position of the electronic device and the selected location; and in response to the distance being less than a pre-determined threshold, generating an electronic identity verification object, wherein the electronic identity verification object is uniquely associated with one or more verified user attributes and the selected location.

In another aspect, at least one non-transitory computer readable medium storing instructions which when executed by at least one processor, may cause the at least one processor to: receive, from an electronic device associated with a user, a current position of the electronic device and a search request including one or more parameters for filtering a plurality of locations; generate a list of available locations based on the current position of the electronic device and the search request, wherein the list of available locations is a filtered subset of the plurality of locations; receive, from the electronic device, a selection of a selected location included in the list of available locations; verify an identity of the user, wherein the identity of the user includes one or more user attributes; in response to successfully verifying the identity of the user, determine a distance between the current position of the electronic device and the selected location; and in response to the distance being less than a pre-determined threshold, generate an electronic identity verification object, wherein the electronic identity verification object is uniquely associated with one or more verified user attributes and the selected location.

In another aspect, a system may be provided comprising one or more processors and one or more computer-readable storage media having computer-readable instructions stored thereon, wherein the computer-readable instructions, when executed by the one or more processors, cause the one or more processors to: receive, from an electronic device associated with a user, a current position of the electronic device and a search request including one or more parameters for filtering a plurality of locations; generate a list of available locations based on the current position of the electronic device and the search request, wherein the list of available locations is a filtered subset of the plurality of locations; receive, from the electronic device, a selection of a selected location included in the list of available locations; verify an identity of the user, wherein the identity of the user includes one or more user attributes; in response to successfully verifying the identity of the user, determine a distance between the current position of the electronic device and the selected location; and in response to the distance being less than a pre-determined threshold, generate an electronic identity verification object, wherein the electronic identity verification object is uniquely associated with one or more verified user attributes and the selected location.

In another aspect, a method may include confirming, over an electronic network, a status of the individual; receiving a geolocation of the individual; receiving a location of an establishment within a set location of the individual's geolocation; and generating a virtual identification page operable to be shown to the establishment to receive a benefit. The virtual identification page may include the date, an active time counter, the establishment's name, and/or an identifier for the individual.

The identifier for the individual may be the individual's photograph, name, or combination thereof. The virtual identification page may further include the benefit for the establishment and/or a disclaimer. In one example, the benefit may be a discount. The set distance may be 20 meters. If an establishment is not within the set distance of the individual's geolocation, a virtual identification page is not generated. The virtual identification page expires when the geolocation of the individual is no longer within the set distance of the establishment's location. The method may further include searching for the establishment within a searching distance from the individual's geolocation. The searching distance is further than the set distance. The individual may be selected from active or veteran military, first responders, police, fire fighter, and/or EMT. The status of the individual may be based on their prior validation as active or veteran military, first responders, police, fire fighter, or EMT. The status may be approved or rejected. The method may further include confirming a status of the establishment.

In another aspect, at least one non-transitory computer readable medium storing instructions which when executed by at least one processor, may cause the at least one processor to: confirm a status of an individual; receive a geolocation of the individual; receive a location of an establishment within a set distance of the individual's geolocation; and generate a virtual identification page.

The virtual identification page may include the date, an active time counter, the establishment's name, and/or an identifier for the individual. The identifier for the individual may be the individual's photograph, name, or combination thereof. The virtual identification page may further include the benefit for the establishment and/or a disclaimer. The set distance may be 20 meters. The at least one processor may search for an establishment within a searching distance from the individual's geolocation. The individual may be selected from active or veteran military, first responders, police, fire fighter, and/or EMT. A status of the establishment may further be confirmed.

Additional aspects and features are set forth in part in the description that follows, and will become apparent to those skilled in the art upon examination of the specification or may be learned by the practice of the disclosed subject matter. A further understanding of the nature and advantages of the disclosure may be realized by reference to the remaining portions of the specification and the drawings, which forms a part of this disclosure.

DESCRIPTION OF THE DRAWINGS

The description will be more fully understood with reference to the following figures, which are presented as variations of the disclosure and should not be construed as a complete recitation of the scope of the disclosure, wherein.

DETAILED DESCRIPTION

The method of verifying the identity of an individual will be understood from the accompanying drawings, taken in conjunction with the accompanying description. It is noted that, for purposes of illustrative clarity, certain elements in various drawings may not be drawn to scale. Several variations of the device are presented herein. It should be understood that various components, parts, and features of the different variations may be combined together and/or interchanged with one another, all of which are within the scope of the present application, even though not all variations and particular variations are shown in the drawings. It should also be understood that the mixing and matching of features, elements, and/or functions between various variations is expressly contemplated herein so that one of ordinary skill in the art would appreciate from this disclosure that the features, elements, and/or functions of one variation may be incorporated into another variation as appropriate, unless described otherwise.

For purposes of this description, "defender" refers to active or veteran military, first responders, police, fire fighter, and/or EMTs. In some examples, "defender" can be a user attribute included in or associated with an identity of a user. For example, being a "defender" may be considered a user attribute and/or user membership in a group consisting of active or veteran military, first responders, police, firefights, and/or EMTs can be considered a user attribute(s).

I. Method for Verifying the Identity of an Individual

Provided herein is a method for verifying the identity of an individual such that they may receive a benefit offered by an establishment only to verified individuals. In some aspects, the terms "individual" and "user" may be used interchangeably herein. For example, an individual can be a user associated with one or more electronic devices.

Figure 1:
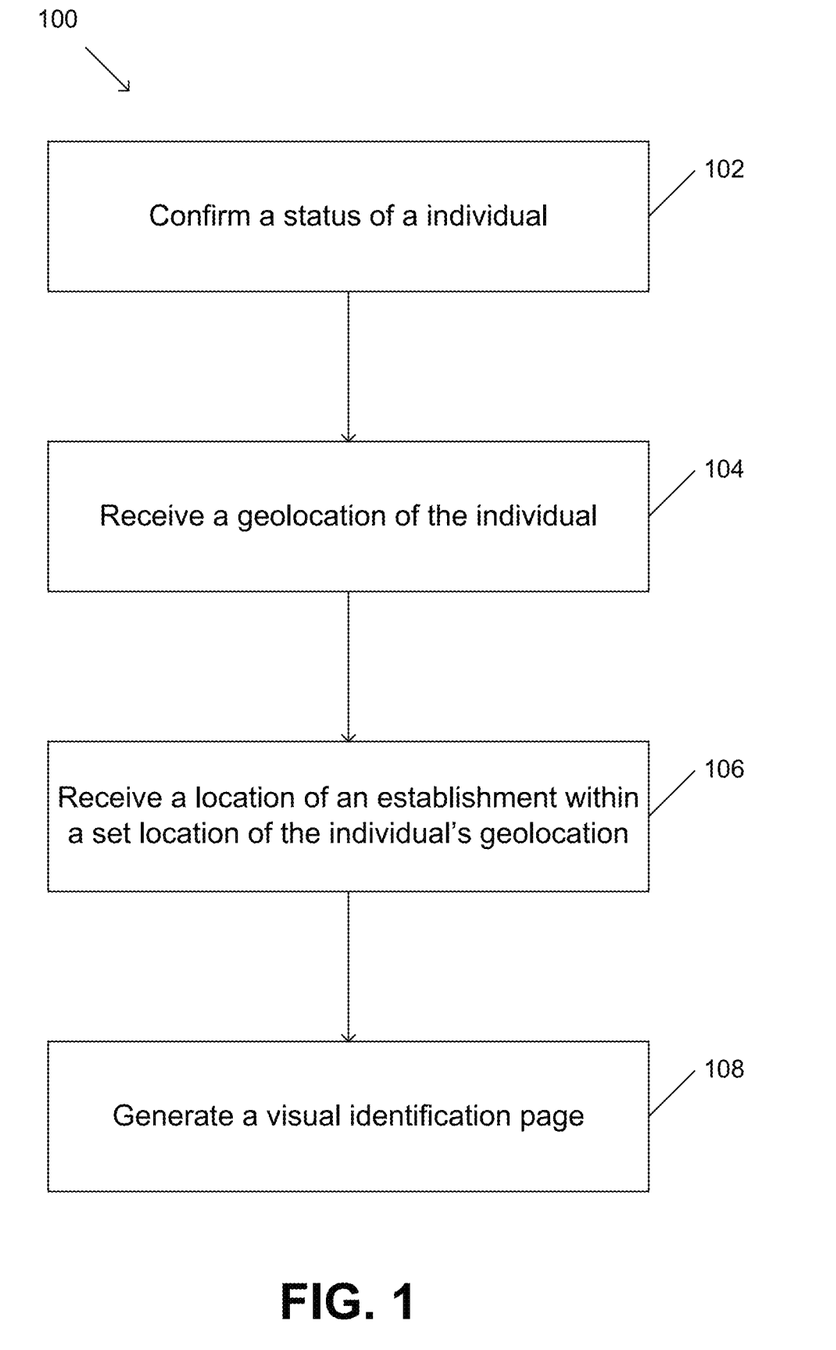
FIG. 1 shows a method of verifying the identity of an individual in an example.

Referring to FIG. 1, a flowchart is presented in accordance with an example embodiment. The method 100 is provided by way of example, as there are a variety of ways to carry out the method. Each block shown in FIG. 1 represents one or more processes, methods or subroutines, carried out in the example method 100. Furthermore, the illustrated order of blocks is illustrative only and the order of the blocks can change according to the present disclosure. Additional blocks may be added or fewer blocks may be utilized, without departing from this disclosure.

The example method 100 is a method for verifying the identity of an individual (e.g., a user associated with an electronic device). In some aspects, the example method 100 can be used to generate an electronic identity verification object, as will be described in greater depth below. The example method 100 can begin at block 102. At block 102, a status of the individual may be confirmed. For exampling, confirming a status of the individual can include verifying an identity of the user associated with an electronic device, wherein the identity of the user includes one or more user attributes (e.g., such as being a defender, or having membership in a group including active or veteran military, first responders, police, fire fighter, and/or EMTs). At block 104, a geolocation of an individual may be received. For example, a current position of the electronic device associated with the user can be received. In some aspects, the electronic device associated with the user can include one or more of a smartphone, a tablet computer, a laptop computer, a smartwatch or wearable computing device, and/or other mobile computing devices, etc. At block 106, a location of an establishment within a set distance of the individual's geolocation may be received. For example, the location of the establishment can be received or obtained based on a user search request specifying a search radius (e.g., distance away from the user's current position), wherein the location of the establishment is within the search radius specified according to the user search request. At block 108, a virtual identification page may be generated to be presented by the individual to the establishment. In some examples, the virtual identification page can include or be generated based on an electronic identity verification object. The electronic identity verification object can be generated to be uniquely associated with one or more verified user attributes (e.g., status as a defender, veteran, first responder, police, etc.) and a selected location (e.g., the establishment). In some examples, the method may further include the individual receiving a benefit from the establishment.

The confirmation of the status of the individual allows for an establishment to know that the individual has been pre-confirmed as someone they would like to provide a benefit to, such as providing a discount to a defender. In some examples, the identity of the individual may be confirmed over an electronic network. For example, an identity of a user may be verified to include one or more self-reported user attributes, such as being a defender. In some examples, a user may provide supporting or supplemental information to prove their self-reported status of being a defender (e.g., to prove their self-reported attribute of being a defender). In some aspects, supporting or supplemental information provided by the user (e.g., also referred to as "user-reported information") can be verified automatically based on querying one or databases to obtain user attribute information that matches the self-reported user attribute. The confirmation may include confirming that the individual is a defender. For example, individual may be active or veteran military, first responders, police, fire fighter, and/or EMT. In some examples, the status of the individual is based on their prior validation as active or veteran military, first responders, police, fire fighter, or EMT. In other examples, the individual may be required to provide proof of being a defender, such as an active military card. Based on the prior validation or provided proof, the status of the individual may be approved or rejected. The individual's status (ex. processing, approved, or rejected) may be stored for future use.

After an individual has confirmed their status as a defender, their geolocation may be acquired. In some examples, a geolocation (and/or position information) can be acquired concurrent with or after an individual has confirmed their status as a defender. The geolocation may be acquired from the individual's phone. In some examples, the geolocation can be a Global Positioning System (GPS) coordinate, or other current position information of an electronic device associated with the user. In an example, the individual's geolocation may be a latitude and longitude within about 10 meters from the individual's phone. The individual's geolocation may be compared to a list of establishments providing benefits to verified individuals. In an example, the set distance may be 10 m, 20 m, 30 m, 40 m, 50 m, 60 m, 70 m, 80 m, 90 m, or 100 m. In at least one example, the set distance is about 20 meters. If no establishments are identified within the set distance, the individual may be asked if they want to recommend the location they are in. If the individual recommends their current location, the latitude and longitude of the individual may be submitted as recommendation for an establishment to provide a future benefit.

In another example, the individual's geolocation may be used to help the individual identify establishments within a searching distance from their location that are providing a benefit. In some examples, the searching distance may be longer than the set distance, such that the individual may need to travel to be within the set distance for the virtual identification page to be generated. In other examples, the searching distance may be less than or equal to the set distance. In an example, the searching distance may be about 10 m, 20 m, 30 m, 40 m, 50 m, 60 m, 70 m, 80 m, 90 m, or 100 m.

In some aspects, a current position of an electronic device associated with a user can be received (e.g., received from the electronic device), as well as a search request including one or more parameters for filtering a plurality of locations. For example, the plurality of locations to be filtered can be a set of establishments that are registered with or otherwise known to the systems and techniques described herein. The one or more parameters included in the search request can include, but are not limited to, user-provided information such as a maximum search distance or a search radius. In some examples, the maximum search distance or search radius can be a distance relative to the user's current position (e.g., relative to the current position of the user's electronic device). In some examples, a default or pre-defined search distance or search radius can be utilized. When a default or pre-defined search distance or search radius is utilized, in some examples a search request may not be transmitted or received.

Based on the search radius (or a default search distance) and the current position of the user's electronic device, the plurality of locations can be filtered to generate a list of available locations that are located within the search radius. In some cases, the list of available locations is filtered from a plurality of locations that are known or confirmed to provide a benefit to individuals or users who match a verified attribute (e.g., such as being a defender). In some examples, the list of available locations can be filtered from a plurality of locations that may or may not provide a benefit to individuals or users who match a verified attribute. In such scenarios, the plurality of locations can be filtered based on the position of the electronic device and the search radius (e.g., as described above) and may be further filtered based on determining whether each location provides a benefit to individuals or users who match a verified attribute (e.g., such as being a defender).

In some examples, the list of available locations can be determined using one or more servers remote from an electronic device associated with the user, in which case the list of available locations can be transmitted from the server(s) to the user's electronic device for display. In some cases, the list of available locations can be determined wholly or partially using local processing implemented by the user's electronic device. The electronic device can display or provide the list of available locations in a user interface, wherein the user interface allows the user to provide one or more selected locations (e.g., from the list of available locations that are within the search radius relative to the user's current position and offer a benefit based on a verified attribute of the user).

The geolocation allows for the establishment to confirm that the individual having the confirmed status is the same person at the establishment requesting the benefit. For example, if an establishment is not within the set distance of the individual's geolocation, a virtual identification page (e.g., and/or an electronic identity verification object) is not generated. In another example, the virtual identification page (and/or electronic identity verification object) expires when the geolocation of the individual is no longer within the set distance, such as 20 m, of the establishment's location.

For example, an electronic identity verification object may be generated based on successfully verifying the identity of the user (e.g., successfully verifying that the identity of the user includes one or more user attributes, such as being a defender). In response to successfully verifying the identity of the user, a distance between the current position of the user's electronic device and the selected location (e.g., selected establishment) can be determined and compared to a second threshold. The second threshold can indicate a proximity or minimum distance to a given establishment that is required before the user's electronic device is permitted to generate an electronic identity verification object for the unique combination of the verified user attribute (e.g., being a defender) and the selected location.

The determination of the distance between the current position of the user's electronic device and a selected location can be different than the previously described determination of the distance between the current position of the user's electronic device and a plurality of locations that are searched in order to generate an initial list of available locations (e.g., from which the selected location is selected). In some examples, the systems and techniques described herein can generate an electronic identity verification object to include an elapsed time object and/or a distance tracking object.

For example, an elapsed time object can track an elapsed time since the electronic identity verification object was generated. In some cases, the electronic identity verification object can be automatically invalidated based on a determination that the elapsed time has exceeded a pre-determined threshold. For example, an electronic identity verification object may be automatically invalidated after a set amount of time, such as 10 minutes, 15 minutes, 20 minutes, etc.

A distance tracking object, included in the electronic identity verification object, can track the distance between an updated position of the user's electronic device and the selected location (e.g., establishment). For example, an updated distance between the user's electronic device and the selected location can be determined continuously, in response to detecting a change in the position of the user's electronic device. In some examples, an updated distance can be determined periodically, for example at a fixed or pre-determined interval. In some cases, the electronic identity verification object can be automatically invalidated based on a determination that the updated distance between the user's electronic device and the selected location has exceeded a pre-determined threshold. In some examples, the pre-determined distance threshold can be the same as or similar to the distance threshold required to initially generate the electronic identity verification object.

The method may further include confirming a status of the establishment. The status of the establishment may be active, probation, closed, or deleted When the individual is ready to receive the benefit, a virtual identification page may be generated. The geolocation of the individual may be checked again to confirm that the individual is still within the set distance of the establishment. In some examples, the virtual identification page may be generated through an application on the individual's phone. The application may use location data for the matched establishment (ex. name, discount, disclaimer, and/or latitude/longitude), establishment status (ex. active, probation, closed, or deleted), individual location, and/or individual status to generate the virtual identification page if the individual's status and establishment's status are approved and active, respectively. In addition, the individual may be required to provide in-person verification before the virtual identification page is generated. Non-limiting examples of in-person verification include a 4 digit pin (set by the individual), face ID, or fingerprint ID. In some examples, an individual (e.g., user) can be prompted to provide one or more biometric data inputs in order to generate the virtual identification page (e.g., electronic identity verification object). The one or more biometric data inputs can include fingerprint data, facial data, and/or various other biometric data inputs associated with the user. In some cases, the biometric data inputs can be obtained using the user's electronic device. The biometric data inputs can be authenticated locally (e.g., on-board or by the user's electronic device) and/or can be authenticated remotely (e.g., based on transmitting some or all of the biometric data inputs, or representations thereof, to a remote authentication server).

Figure 4:
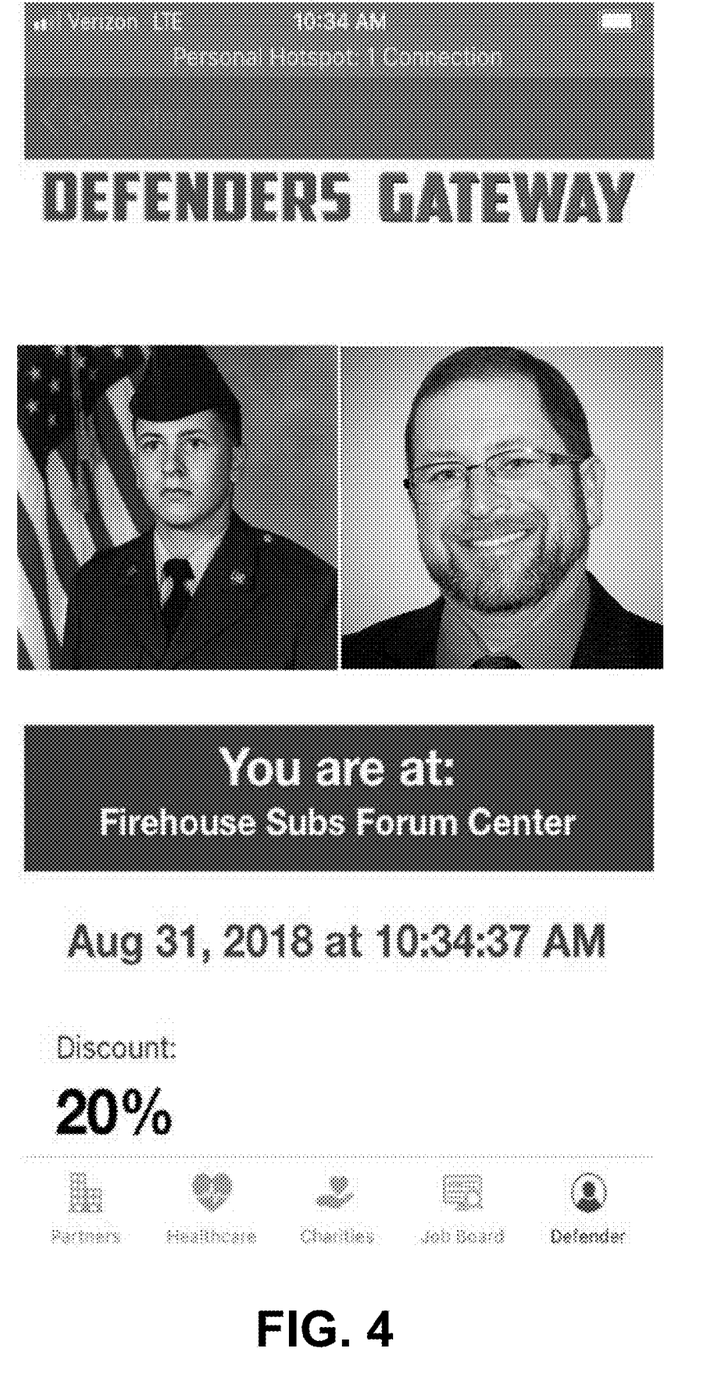
FIG. 4 shows an example virtual identification page.
Figure 5:
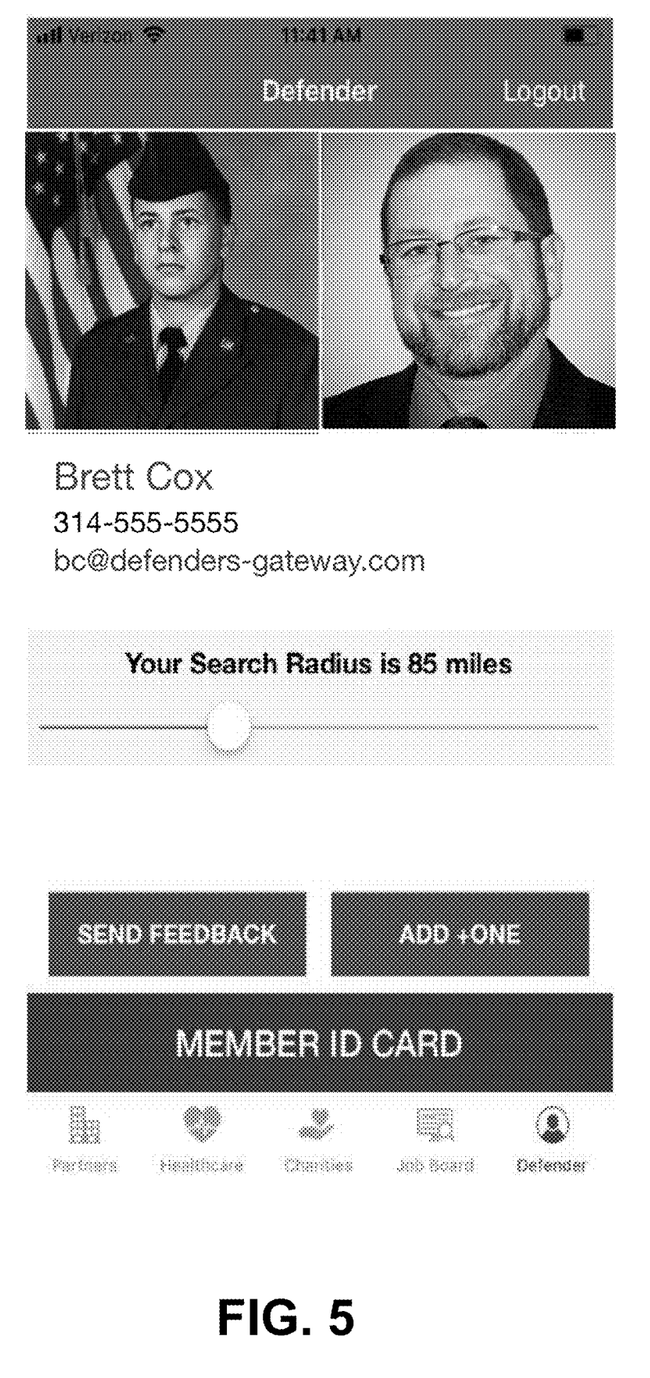
FIG. 5 shows an example starting page with a selectable search radius.

Once generated, the virtual identification page (e.g., also referred to herein as an "electronic identity verification object") may be presented on the individual's phone. In some examples, the virtual identification page may include the date, an active time counter (e.g., which can be the same as, similar to, or associated with the elapsed time object described above as being included in the electronic identity verification object), the establishment's name, and/or an identifier for the individual. The virtual identification page allows the establishment to confirm that the individual requesting the benefit is the same individual that has been verified as a defender. The geolocation in combination with the display of the date and time counter help ensure that the verified individual is the person requesting the benefit. For example, the active counter prevents a screenshot of the benefit from being shared and/or used by someone other than the verified individual. The active counter may be constantly counting seconds, minutes, and hours since the virtual identification page was generated. In some examples, the identifier for the individual may be the individual's photograph, name, or combinations thereof. In some examples, the virtual identification page may further include the benefit for the establishment and/or a benefit disclaimer. FIG. 4 shows an example virtual identification page and FIG. 5 shows an example starting page with a selectable search radius.

Figure 2:
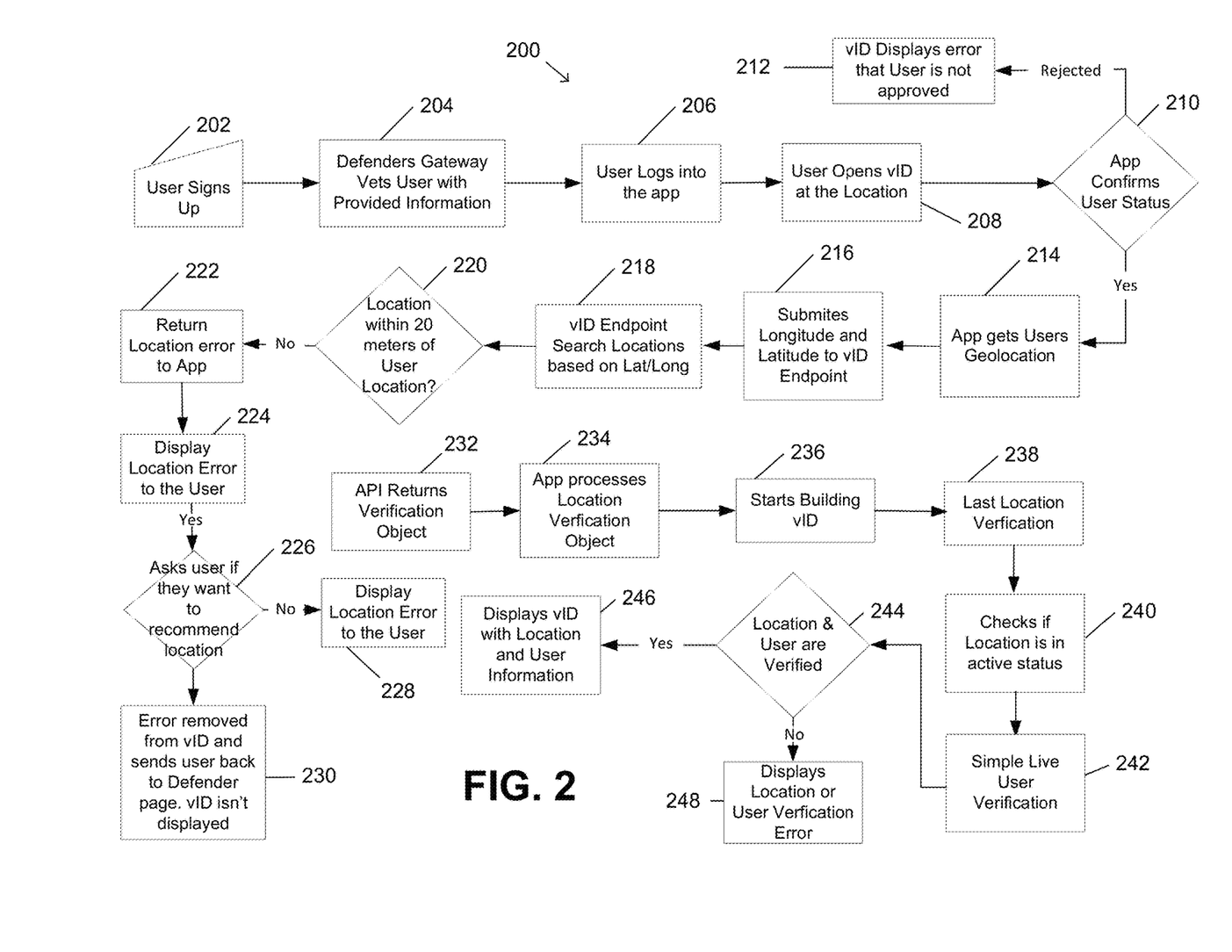
FIG. 2 shows a method of verifying the identity of an individual and generating a virtual identification page in an example.

Referring to FIG. 2, a flowchart is presented in accordance with an example embodiment. The method 200 is provided by way of example, as there are a variety of ways to carry out the method. Each block shown in FIG. 2 represents one or more processes, methods or subroutines, carried out in the example method 200. Furthermore, the illustrated order of blocks is illustrative only and the order of the blocks can change according to the present disclosure. Additional blocks may be added or fewer blocks may be utilized, without departing from this disclosure.

The example method 200 is a method for verifying the identity of an individual. The example method 200 can begin at block 202. At block 202, the user signs up by providing information to show they are a defender. At block 204, the user is vetted using the provided information. At block 206, the user signs into the application. At block 208, the user opens the virtual identification (vID) of the application at the location of an establishment. At block 210, the status of the user is confirmed. For example, an identity of the user can be verified, wherein the identity of the user includes one or more user attributes (e.g., being a defender). If the user is rejected, the vID displays an error that the user is not approved, at block 212. At block 214, the application receives the user's geolocation (e.g., current position of the electronic device associated with the user) if the user is approved (e.g., if the identity of the user and/or one or more user attributes included in the identity of the user are successfully verified). At block 216, the longitude and latitude of the geolocation are submitted to the vID endpoint. At block 218, the vID endpoint searches establishment locations based on the longitude and latitude. At block 220, the geolocation of the user is compared to the establishment location (e.g., a selected location, wherein the selection is based at least in part on the searching at block 218). At block 222, if the geolocation of the user is not within 20 meters of an establishment, a location error is returned. At block 224, a location error is displayed to the user. At block 226, the user is asked if they would like to recommend a location of a new establishment. If the user would like to recommend a location, the recommendation is sent to a recommendation server, at block 228. If the user does not have a recommendation, the vID is not displayed and the user is sent back to another page, at block 230. At block 232, the API returns a location verification object if the user is within 20 meters of the location of an establishment. At step 234, the location verification object is processed. At step 236, the vID is created. At step 238, the geolocation of the user and the location of the establishment are verified again. At step 240, the status of the establishment is checked to be active. At step 242, a live user verification is performed, such as a PIN, fingerprint, or face recognition. At step 244, the verification of the user and establishment are checked. At step 246, if the verification of the user and establishment are confirmed, then the vID with user and establishment information is displayed. At step 248, if the verification of the user or establishment is not confirmed, then a user or establishment location error is displayed.

II. Computing System

Figure 3:
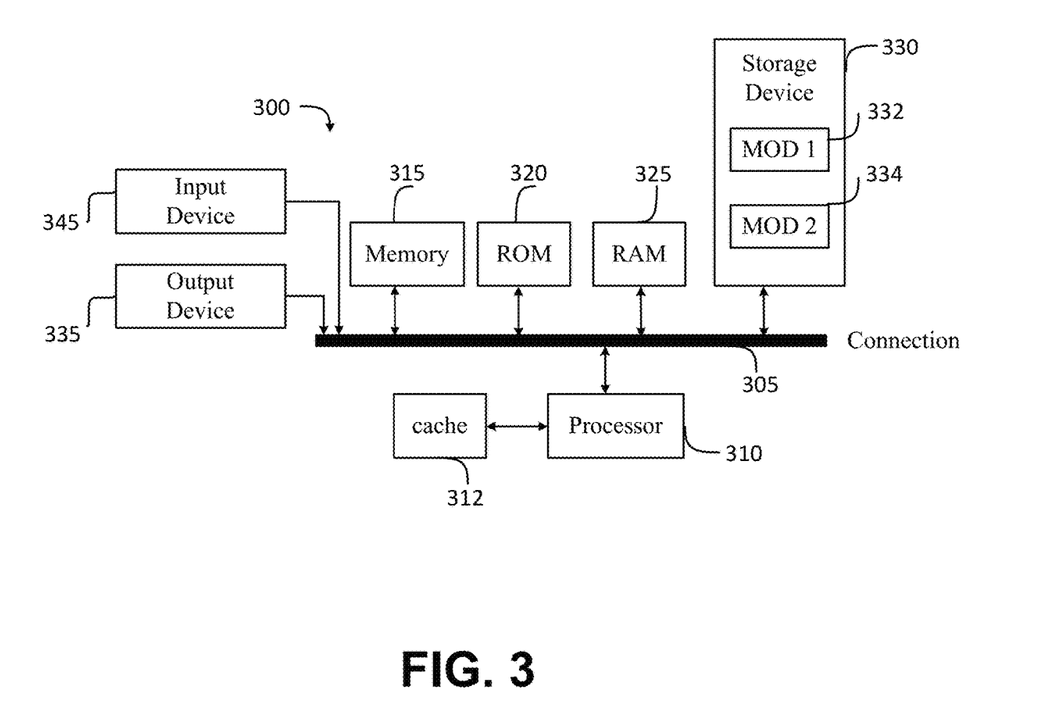
FIG. 3 shows an example of a computing system.

FIG. 3 shows an example of computing system 300 in which the components of the system are in communication with each other using connection 305. Connection 305 can be a physical connection via a bus, or a direct connection into processor 310, such as in a chipset or system-on-chip architecture. Connection 305 can also be a virtual connection, networked connection, or logical connection.

In some examples, one or more of the described system components represents many such components each performing some or all of the function for which the component is described. In some examples, the components can be physical or virtual devices.

Example computing system 300 includes at least one processing unit (CPU or processor) 310 and connection 305 that couples various system components including system memory 315, read only memory (ROM) 320 or random access memory (RAM) 325 to processor 310. Computing system 300 can include a cache of high-speed memory 312 connected directly with, in close proximity to, or integrated as part of processor 310.

Processor 310 can include any general purpose processor and a hardware service or software service, such as a location system 332 and data processing system 334 stored in storage device 330, configured to control processor 310 as well as a special-purpose processor where software instructions are incorporated into the actual processor design. Processor 310 may essentially be a completely self-contained computing system, containing multiple cores or processors, a bus, memory controller, cache, etc. A multi-core processor may be symmetric or asymmetric.

To enable user interaction, computing system 300 includes an input device 345, which can represent any number of input mechanisms, such as a touch-sensitive screen for gesture or graphical input, keyboard, mouse, or input from a sensor output portion. The input device 345 may be wired or wireless. Computing system 300 can also include output device 335, which can be one or more of a number of output mechanisms known to those of skill in the art. For example, the output device 335 may be a display. In some instances, multimodal systems can enable a user to provide multiple types of input/output to communicate with computing system 300. There is no restriction on operating on any particular hardware arrangement and therefore the basic features here may easily be substituted for improved hardware or firmware arrangements as they are developed.

Storage device 330 can be a non-volatile memory device and can be a hard disk or other types of computer readable media which can store data that are accessible by a computer, such as magnetic cassettes, flash memory cards, solid state memory devices, digital versatile disks, cartridges, battery backed random access memories (RAMs), read only memory (ROM), and/or some combination of these devices.

The storage device 330 can include software services, servers, services, etc., that when the code that defines such software is executed by the processor 310, it causes the system to perform a function. In some examples, a hardware service that performs a particular function can include the software component stored in a computer-readable medium in connection with the necessary hardware components, such as processor 310, connection 305, output device 335, etc., to carry out the function.

Provided herein is at least one non-transitory computer readable medium storing instructions which when executed by at least one processor, cause the at least one processor to confirm a status of an individual, receive a geolocation of the individual, receive a location of an establishment within a set distance of the individual's geolocation, and generate a virtual identification page. The individual may then present the virtual identification page to the establishment. In some examples, the individual receives a benefit, such as a discount, from the establishment after presenting the virtual identification.

The particular variations disclosed above are illustrative only, as the variations may be modified and practiced in different but equivalent manners apparent to those skilled in the art having the benefit of the teachings herein. It is therefore evident that the particular variations disclosed above may be altered or modified, and all such variations are considered within the scope and spirit of the application. Accordingly, the protection sought herein is as set forth in the description. Although the present variations are shown above, they are not limited to just these variations, but are amenable to various changes and modifications without departing from the spirit thereof. Additionally, a number of well-known processes and elements have not been described in order to avoid unnecessarily obscuring the present invention. Accordingly, the above description should not be taken as limiting the scope of the invention.

Numerous examples are provided herein to enhance the understanding of the present disclosure. In this regard, a specific set of statements are provided below characterizing various examples of oral pharmaceutical compositions and methods of treatment described herein.

Statement 1: A computer-implemented method for generating an electronic identity verification object, the computer-implemented method comprising: receiving, from an electronic device associated with a user, a current position of the electronic device and a search request including one or more parameters for filtering a plurality of locations; generating a list of available locations based on the current position of the electronic device and the search request, wherein the list of available locations is a filtered subset of the plurality of locations; receiving, from the electronic device, a selection of a selected location included in the list of available locations; verifying an identity of the user, wherein the identity of the user includes one or more user attributes; in response to successfully verifying the identity of the user, determining a distance between the current position of the electronic device and the selected location; and in response to the distance being less than a pre-determined threshold, generating an electronic identity verification object, wherein the electronic identity verification object is uniquely associated with one or more verified user attributes and the selected location.

Statement 2: The computer-implemented method of statement 1, wherein the electronic identity verification object includes: an elapsed time object, wherein the elapsed time object is indicative of an elapsed time from generating the electronic identity verification object; and a distance tracking object, wherein the distance tracking object is indicative of an updated distance between an updated current position of the electronic device and the selected location.

Statement 3: The computer-implemented method of statement 1, further comprising: automatically invalidating the electronic identity verification object based on an elapsed time from generating the electronic identity verification object exceeding a pre-determined threshold.

Statement 4: The computer-implemented method of statement 1, further comprising: automatically invalidating the electronic identity verification object based on an updated distance between an updated current position of the electronic device and the selected location exceeding a pre-determined threshold.

Statement 5: The computer-implemented method of statement 1, wherein the electronic identity verification object is generated in response to: successfully verifying the identity of the user; and the distance being less than the pre-determined threshold.

Statement 6: The computer-implemented method of statement 1, wherein the electronic identity verification object is generated in response to: the distance being less than the pre-determined threshold; and obtaining an authentication of one or more biometric data inputs associated with the user.

Statement 7. The computer-implemented method of statement 6, wherein obtaining the authentication comprises: obtaining authentication data indicative of the electronic device authenticating biometric data of the user.

Statement 8: The computer-implemented method of statement 1, wherein the one or more parameters include a user input indicative of a search radius.

Statement 9: The computer-implemented method of statement 8, wherein each respective available location included in the list of available locations is filtered from the plurality of locations based on a distance between the current position of the electronic device and the respective available location being less than the search radius.

Statement 10: The computer-implemented method of statement 1, wherein the list of available locations is filtered from the plurality of locations based on determining that each respective available location included in the list of available locations provides a benefit associated with the verified user attribute.

Statement 11: The computer-implemented method of statement 10, wherein the benefit is a discount.

Statement 12: The computer-implemented method of statement 1, wherein the one or more user attributes comprises a user membership in a group consisting of active or veteran military, first responders, police, firefighters, and EMTs.

Statement 13: The computer-implemented method of statement 12, wherein verifying the identity of the user includes verifying the one or more user attributes based on user-reported information.

Statement 14: The computer-implemented method of statement 13, wherein verifying the one or more user attributes comprises confirming a prior verification of the user.

Statement 15: The computer-implemented method of statement 13, wherein verifying the one or more user attributes comprises querying one or more databases to obtain user attribute information that matches the user-reported information.

Statement 16: At least one non-transitory computer readable medium storing instructions which when executed by at least one processor, cause the at least one processor to: receive, from an electronic device associated with a user, a current position of the electronic device and a search request including one or more parameters for filtering a plurality of locations; generate a list of available locations based on the current position of the electronic device and the search request, wherein the list of available locations is a filtered subset of the plurality of locations; receive, from the electronic device, a selection of a selected location included in the list of available locations; verify an identity of the user, wherein the identity of the user includes one or more user attributes; in response to successfully verifying the identity of the user, determine a distance between the current position of the electronic device and the selected location; and in response to the distance being less than a pre-determined threshold, generate an electronic identity verification object, wherein the electronic identity verification object is uniquely associated with one or more verified user attributes and the selected location.

Statement 17: The at least one non-transitory computer readable medium of statement 16, wherein the electronic identity verification object includes: an elapsed time object, wherein the elapsed time object is indicative of an elapsed time from generating the electronic identity verification object; and a distance tracking object, wherein the distance tracking object is indicative of an updated distance between an updated current position of the electronic device and the selected location.

Statement 18: The at least one non-transitory computer readable medium of claim 16, wherein the instructions further cause the at least one processor to: automatically invalidate the electronic identity verification object based on an elapsed time from generating the electronic identity verification object exceeding a pre-determined threshold; or automatically invalidate the electronic identity verification object based on an updated distance between an updated current position of the electronic device and the selected location exceeding a pre-determined threshold.

Statement 19: A system comprising: one or more processors; and one or more computer-readable storage media having computer-readable instructions stored thereon, wherein the computer-readable instructions, when executed by the one or more processors, cause the one or more processors to: receive, from an electronic device associated with a user, a current position of the electronic device and a search request including one or more parameters for filtering a plurality of locations; generate a list of available locations based on the current position of the electronic device and the search request, wherein the list of available locations is a filtered subset of the plurality of locations; receive, from the electronic device, a selection of a selected location included in the list of available locations; verify an identity of the user, wherein the identity of the user includes one or more user attributes; in response to successfully verifying the identity of the user, determine a distance between the current position of the electronic device and the selected location; and in response to the distance being less than a pre-determined threshold, generate an electronic identity verification object, wherein the electronic identity verification object is uniquely associated with one or more verified user attributes and the selected location.

Statement 20: The system of statement 19, wherein the computer-readable instructions further cause the one or more processors to: automatically invalidate the electronic identity verification object based on an elapsed time from generating the electronic identity verification object exceeding a pre-determined threshold; or automatically invalidate the electronic identity verification object based on an updated distance between an updated current position of the electronic device and the selected location exceeding a pre-determined threshold.

Those skilled in the art will appreciate that the presently disclosed variations teach by way of example and not by limitation. Therefore, the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A computer-implemented method for generating an electronic identity verification object, the computer-implemented method comprising:
- receiving, from an electronic device associated with a user, a current position of the electronic device and a search request including one or more parameters for filtering a plurality of locations;
- generating a list of available locations based on the current position of the electronic device and the search request, wherein the list of available locations is a filtered subset of the plurality of locations;
- receiving, from the electronic device, a selection of a selected location included in the list of available locations;
- verifying an identity of the user, wherein the identity of the user includes one or more user attributes comprising a user membership in a group consisting of active military, veteran military, first responders, police, firefighters, and EMTs;
- in response to successfully verifying the identity of the user, determining that the selected location provides a benefit associated with the verified user attribute;
- determining a distance between the current position of the electronic device and the selected location;
- in response to the distance being less than a pre-determined threshold, generating an electronic identity verification object, wherein the electronic identity verification object is uniquely associated with one or more verified user attributes and the selected location, the electronic identity verification object comprising the one or more verified user attributes;
- displaying the generated electronic identity verification object to provide access to the benefit associated with the verified user attribute to the user; and
- automatically invalidating the electronic identity verification object based on an updated distance between an updated current position of the electronic device and the selected location exceeding a pre-determined threshold.

2. The computer-implemented method of claim 1, wherein the electronic identity verification object includes:
- an elapsed time object, wherein the elapsed time object is indicative of an elapsed time from generating the electronic identity verification object; and
- a distance tracking object, wherein the distance tracking object is indicative of an updated distance between an updated current position of the electronic device and the selected location.

3. The computer-implemented method of claim 1, further comprising:
- automatically invalidating the electronic identity verification object based on an elapsed time from generating the electronic identity verification object exceeding a pre-determined threshold.

4. The computer-implemented method of claim 1, wherein the electronic identity verification object is generated in response to:
- successfully verifying the identity of the user; and
- the distance being less than the pre-determined threshold.

5. The computer-implemented method of claim 1, wherein the electronic identity verification object is generated in response to:
- the distance being less than the pre-determined threshold; and
- obtaining an authentication of one or more biometric data inputs associated with the user.

6. The computer-implemented method of claim 5, wherein obtaining the authentication comprises:
- obtaining authentication data indicative of the electronic device authenticating biometric data of the user.

7. The computer-implemented method of claim 1, wherein the one or more parameters include a user input indicative of a search radius.

8. The computer-implemented method of claim 7, wherein each respective available location included in the list of available locations is filtered from the plurality of locations based on a distance between the current position of the electronic device and the respective available location being less than the search radius.

9. The computer-implemented method of claim 1, wherein the list of available locations is filtered from the plurality of locations based on determining that each respective available location included in the list of available locations provides a benefit associated with the verified user attribute.

10. The computer-implemented method of claim 1, wherein verifying the identity of the user includes verifying the one or more user attributes based on user-reported information.

11. The computer-implemented method of claim 10, wherein verifying the one or more user attributes comprises confirming a prior verification of the user.

12. The computer-implemented method of claim 10, wherein verifying the one or more user attributes comprises querying one or more databases to obtain user attribute information that matches the user-reported information.

13. The computer-implemented method of claim 1, wherein the benefit associated with the verified user attribute is a discount.

14. At least one non-transitory computer readable medium storing instructions which when executed by at least one processor, cause the at least one processor to:
- receive, from an electronic device associated with a user, a current position of the electronic device and a search request including one or more parameters for filtering a plurality of locations;
- generate a list of available locations based on the current position of the electronic device and the search request, wherein the list of available locations is a filtered subset of the plurality of locations;
- receive, from the electronic device, a selection of a selected location included in the list of available locations;
- verify an identity of the user, wherein the identity of the user includes one or more user attributes comprising a user membership in a group consisting of active military, veteran military, first responders, police, firefighters, and EMTs;
- in response to successfully verifying the identity of the user, determine that the selected location provides a benefit associated with the verified user attribute;
- determine a distance between the current position of the electronic device and the selected location;
- in response to the distance being less than a pre-determined threshold, generate an electronic identity verification object, wherein the electronic identity verification object is uniquely associated with one or more verified user attributes and the selected location, the electronic identity verification object comprising the one or more verified user attributes;
- display the generated electronic identity verification object to provide access to the benefit associated with the verified user attribute to the user; and automatically invalidate the electronic identity verification object based on an updated distance between an updated current position of the electronic device and the selected location exceeding a pre-determined threshold.

15. The at least one non-transitory computer readable medium of claim 14, wherein the electronic identity verification object includes:
an elapsed time object, wherein the elapsed time object is indicative of an elapsed time from generating the electronic identity verification object; and
a distance tracking object, wherein the distance tracking object is indicative of an updated distance between an updated current position of the electronic device and the selected location.

16. The at least one non-transitory computer readable medium of claim 15, wherein the instructions further cause the at least one processor to:
automatically invalidate the electronic identity verification object based on an elapsed time from generating the electronic identity verification object exceeding a pre-determined threshold; or
automatically invalidate the electronic identity verification object based on an updated distance between an updated current position of the electronic device and the selected location exceeding a pre-determined threshold.

17. The at least one non-transitory computer readable medium of claim 14, wherein the benefit associated with the verified user attribute is a discount.

18. A system comprising:
one or more processors; and
one or more computer-readable storage media having computer-readable instructions stored thereon, wherein the computer-readable instructions, when executed by the one or more processors, cause the one or more processors to:
receive, from an electronic device associated with a user, a current position of the electronic device and a search request including one or more parameters for filtering a plurality of locations;
generate a list of available locations based on the current position of the electronic device and the search request, wherein the list of available locations is a filtered subset of the plurality of locations;
receive, from the electronic device, a selection of a selected location included in the list of available locations;
verify an identity of the user, wherein the identity of the user includes one or more user attributes comprising a user membership in a group consisting of active military, veteran military, first responders, police, firefighters, and EMTs;
in response to successfully verifying the identity of the user, determine that the selected location provides a benefit associated with the verified user attribute;
determine a distance between the current position of the electronic device and the selected location;
in response to the distance being less than a pre-determined threshold, generate an electronic identity verification object, wherein the electronic identity verification object is uniquely associated with one or more verified user attributes and the selected location, the electronic identity verification object comprising the one or more verified user attributes;
display the generated electronic identity verification object to provide access to the benefit associated with the verified user attribute to the user; and
automatically invalidate the electronic identity verification object based on an updated distance between an updated current position of the electronic device and the selected location exceeding a pre-determined threshold.

19. The system of claim 18, wherein the computer-readable instructions further cause the one or more processors to:
automatically invalidate the electronic identity verification object based on an elapsed time from generating the electronic identity verification object exceeding a pre-determined threshold.

20. The system of claim 18, wherein the benefit associated with the verified user attribute is a discount.

* * * * *